(12) United States Patent
Baskaran et al.

(10) Patent No.: US 8,103,641 B2
(45) Date of Patent: *Jan. 24, 2012

(54) CUSTOMIZABLE METADATA MERGING FRAMEWORK

(75) Inventors: Rajagopal Baskaran, Palo Alto, CA (US); Jaime E. Singson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 501 days.

This patent is subject to a terminal disclaimer.

(21) Appl. No.: 12/323,062

(22) Filed: Nov. 25, 2008

(65) Prior Publication Data

US 2009/0083340 A1 Mar. 26, 2009

Related U.S. Application Data

(63) Continuation of application No. 10/749,037, filed on Dec. 29, 2003, now Pat. No. 7,469,262.

(51) Int. Cl.
*G06F 7/00* (2006.01)
(52) U.S. Cl. ....................................... 707/695
(58) Field of Classification Search ................ 707/638, 707/610, 636, 999.203, 626, 756, 955, 802, 707/806, 808, 695
See application file for complete search history.

(56) References Cited

U.S. PATENT DOCUMENTS

| | | | |
|---|---|---|---|
| 5,649,200 A * | 7/1997 | Leblang et al. | ............... 717/122 |
| 6,216,140 B1 | 4/2001 | Kramer | |
| 6,256,773 B1 | 7/2001 | Bowman-Amuah | |
| 6,415,299 B1 | 7/2002 | Baisley | |
| 6,460,055 B1 | 10/2002 | Midgley | |
| 6,564,368 B1 | 5/2003 | Beckett | |
| 6,675,177 B1 | 1/2004 | Webb | |
| 6,704,755 B2 | 3/2004 | Midgley | |
| 6,766,334 B1 | 7/2004 | Kaler | |
| 6,785,421 B1 | 8/2004 | Gindele | |
| 6,925,467 B2 | 8/2005 | Gu | |
| 7,080,088 B1 * | 7/2006 | Lau | ...................................... 1/1 |
| 7,469,262 B2 * | 12/2008 | Baskaran et al. | ..................... 1/1 |
| 7,711,708 B2 * | 5/2010 | Bergstraesser et al. | ........ 707/638 |
| 2002/0059299 A1 | 5/2002 | Spaey | |
| 2004/0062130 A1 | 4/2004 | Chiang | |
| 2004/0225682 A1 | 11/2004 | Murman | |
| 2005/0010919 A1 | 1/2005 | Ramanathan | |
| 2005/0102328 A1 | 5/2005 | Ring et al. | |
| 2005/0144198 A1 * | 6/2005 | Bergstraesser et al. | ........ 707/203 |

OTHER PUBLICATIONS

Mahmoud, Qusay H., "Web Application Development with JSP and XML-Part IV: Using J2EE Services from JSP", http://java.sun.com/developer/technicalArticles/xml/WebAppDev4/, Jul. 27, 2007, pp. 1-7.

* cited by examiner

*Primary Examiner* — Hung T Vy
(74) *Attorney, Agent, or Firm* — Shun Yao; Park, Vaughan, Fleming & Dowler LLP (57) ABSTRACT

One embodiment of the present invention provides a system that facilitates merging different versions of a database object. During operation, the system receives metadata associated with a first version of a database object and a second version of the database object. The system then compares metadata associated with the first version with metadata associated with the second version to create a difference report. Next, the system uses the different report to create an action plan that specifies how to merge the metadata associated with the first and second versions of the metadata object.

21 Claims, 5 Drawing Sheets

DIFFERENCE REPORT 208

| | TARGET | SOURCE | ACTION PLAN INPUT |
|---|---|---|---|
| TABLE | NAME | NAME | UPDATE |
| COLUMNS | COL 1 | COL 2 | UPDATE |
| | COL 2 | COL 1 | UPDATE |
| | | COL 3 | CREATE |
| PROPERTIES | PROPERTY 1 | | DELETE |
| | | PROPERTY 2 | CREATE |
| | | PROPERTY 3 | CREATE |

FIG. 6

ACTION PLAN 404

| 702 | 704 | | 706 |
|---|---|---|---|
| ☐ | TABLE 502 FROM TABLE 508 | | UPDATE |
| ☐ | COLUMN 1 FROM COLUMN 2 | | UPDATE |
| ☐ | COLUMN 2 FROM COLUMN 1 | | UPDATE |
| ☐ | COLUMN 3 | | CREATE |
| ☐ | PROPERTY 1 | | DELETE |
| ☐ | PROPERTY 2 | | CREATE |
| ☐ | PROPERTY 3 | | CREATE |

CUSTOMIZABLE METADATA MERGING FRAMEWORK

RELATED APPLICATION

This application is a continuation application of application Ser. No. 10/749,037, entitled "Customizable Metadata Merging Framework," by inventors Rajagopal Baskaran and Jaime E. Singson, filed 29 Dec. 2003.

BACKGROUND

1. Field of the Invention

The present invention relates to metadata that is used to define objects in databases. More specifically, the present invention relates to a method and an apparatus that facilitates merging metadata associated with different versions of objects of a database in a customizable manner.

2. Related Art

Databases typically form the backbone of modern electronic business solutions. As business requirements change over time or are modified to meet local requirements, corresponding modifications may need to occur in the structure of an underlying database. These modifications can cause different versions of the same database to diverge over time. This can cause problems when divergent versions of a database need to be subsequently reconciled or updated.

Database objects are typically defined using metadata. The properties, attributes, and relationship of a database object with other database objects can be described using the unified modeling language (UML). The structure of metadata can be modeled using UML (Unified Modeling Language) to define a series of classes, associations, and attributes. For instance, a Table is a Class, a Column is a Class, and a Partition is a Class. 'Name' is an Attribute that exists for a Table, Column, and a Partition Class. A relationship exists between Table and Column (a table owns a column), and so we say there is an Association between the Table Class and Column Class. An end user typically receives metadata that defines a database object, for example a table, from a solutions provider. After receiving this metadata, the end user can typically customize the metadata to change the structure of the metadata object. For example, an end user may customize the metadata to add an additional column to a table or to change a property of the table.

It is possible for different end users to customize the same metadata in different ways. For example, end users in a multi-national corporation located in different jurisdictions may customize metadata to allow a corresponding database to accommodate specific data items required by their local jurisdictions.

In some circumstances, it is desirable to merge different versions of metadata. For example, a solutions provider may generate a new version of the metadata to enhance the database object, or management may want the metadata for two or more databases to be merged. This merging process is presently performed manually, and consequently involves a significant amount of time and effort.

Hence, what is needed is a method and an apparatus that facilitates merging different versions of a database without the problems described above.

SUMMARY

One embodiment of the present invention provides a system that facilitates merging different versions of a database object. During operation, the system receives metadata associated with a first version of a database object and a second version of the database object. The system then compares metadata associated with the first version with metadata associated with the second version to create a difference report. Next, the system uses the different report to create an action plan that specifies how to merge the metadata associated with the first and second versions of the metadata object.

In a variation of this embodiment, metadata associated with the database objects are represented in Unified Modeling Language (UML).

In a further variation, comparing the metadata associated with the first and second versions of the database object involves allowing a user to specify which associations of the database object needs to be compared.

In a further variation, comparing the metadata associated with the first and second versions of the database object involves allowing the user to specify how to compare the metadata for each association in the database object.

In a further variation, creating the action plan involves allowing a user to select which actions to take in merging the metadata in order to produce merged metadata with the desired properties and attributes.

In a further variation, creating the action plan involves examining the difference report to determine what actions to take in bringing the metadata associated with the first version and second versions of the database object into agreement.

In a variation of this embodiment, the metadata associated with the first and second versions of the database object can define Oracle database objects like Dimensions, Cubes, Tables, Views, Materialized views, Transformations, and their associated objects. An example of associated objects is that Column, Foreign Keys, and Unique Keys can be associated with table metadata definition. Oracle is a trademark or registered trademark of Oracle International Corporation.

In a variation of this embodiment, the action plan can specify a number of actions including creating, updating, and deleting of database objects.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Metadata Exchange Strategy Framework

Figure 1:
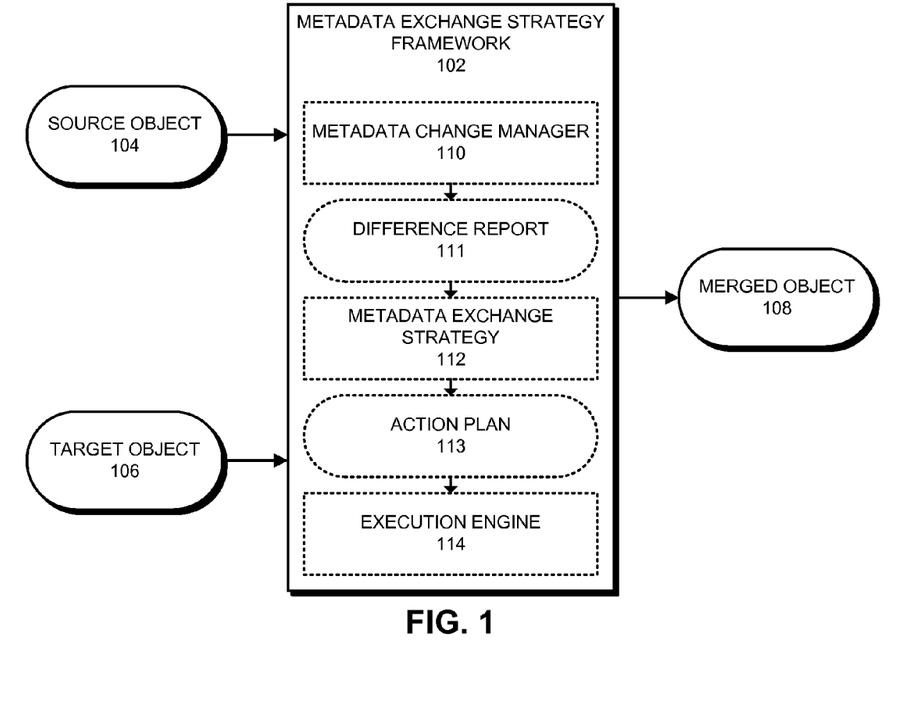
FIG. 1 illustrates a metadata exchange framework in accordance with an embodiment of the present invention.

FIG. 1 illustrates a metadata exchange strategy framework 102 in accordance with an embodiment of the present invention. Metadata exchange strategy framework 102 includes metadata change manager 110, metadata exchange strategy 112, and execution engine 114. Metadata change manager 110 provides functions for creating difference reports, such as difference report 108, as described below in conjunction with FIGS. 2, 3, 5, and 8. Metadata exchange strategy 112 provides functions for creating an action plan, such as action plan 113, as described below in conjunction with FIGS. 4, 6, 7, and 8. Execution engine 114 provides functions for executing the action plan as described below in conjunctions with FIGS. 4 and 8

Metadata exchange strategy framework 102 accepts source object 104 and target object 106 and creates merged object 108. Source object 104, target object 106, and merged object 108 contain metadata describing respective database objects. Source object 104 and target object 108 are descriptions of the same database object that differ, possibly because their metadata definition may have been updated or customized by different users.

Source object 102 and target object 106 are typically Oracle database objects and not just tables and columns (i.e. cubes, transformations, and the like). Also source object 102 and target object 106 may include other objects such as files in a file system or records in a file that have been captured using UML and stored in the database during design time. This is typically achieved by having a table called "file" and a table called "record." The metadata of external table objects refers to the record metadata in the record table. These are not database objects, but still dictate the structure of some database objects. For example the structure of an external table is dictated by the file and record that it is referring to. Hence, there exists a requirement that external tables have to be merged form the record during design time, although recorded is not a database object. Hence, this is not just restricted to database objects but also to others that are marked in UML and stored in the database as classes, attributes, and associations.

Difference Report

Figure 2:
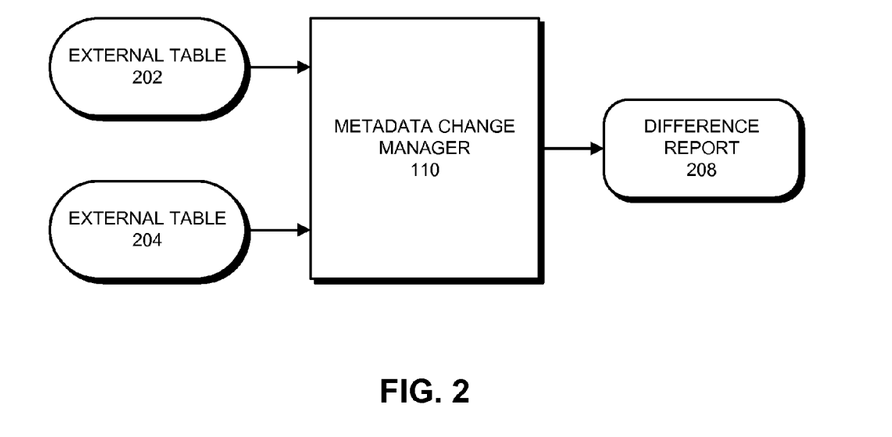
FIG. 2 illustrates the process of creating a difference report from compatible objects in accordance with an embodiment of the present invention.

FIG. 2 illustrates the process of creating a difference report from compatible objects in accordance with an embodiment of the present invention. Metadata change manager 110 receives external tables 202 and 204 and creates a difference report 208, which describes the differences between external tables 202 and 204. For example, external tables 202 and 204 contain metadata describing the same object that differ possibly because one of the external tables is an updated version of the other external table, or because the external tables have been customized by different individuals.

Difference Report from Non-Compatible Objects

Figure 3:
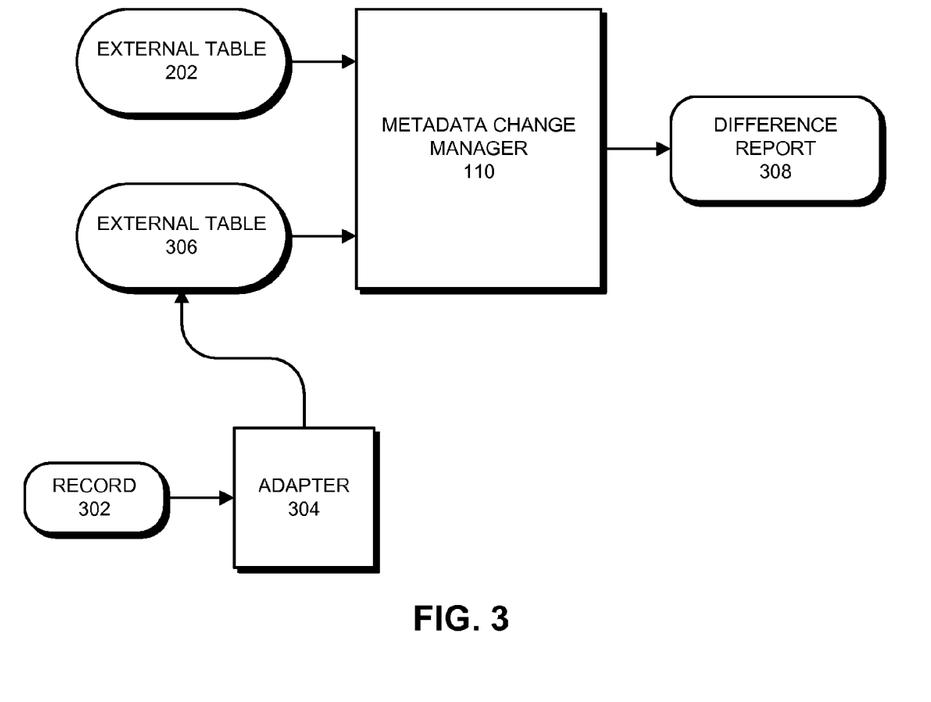
FIG. 3 illustrates the process of creating a difference report from non-compatible objects in accordance with an embodiment of the present invention.

FIG. 3 illustrates the process of creating a difference report from non-compatible objects in accordance with an embodiment of the present invention. In the example illustrated in FIG. 3, a difference report between external table 202 and record 302 is desired. Note that external table 202 may have been originally created from record 302.

Adapter 304 first converts record 302 into compatible external table 306. Metadata change manager 110 then receives external tables 202 and 306 and creates a difference report 308, which describes the differences between external tables 202 and record 302, which are ultimately the differences between external table 202 and record 302.

Action Plan and Merged Object

Figure 4:
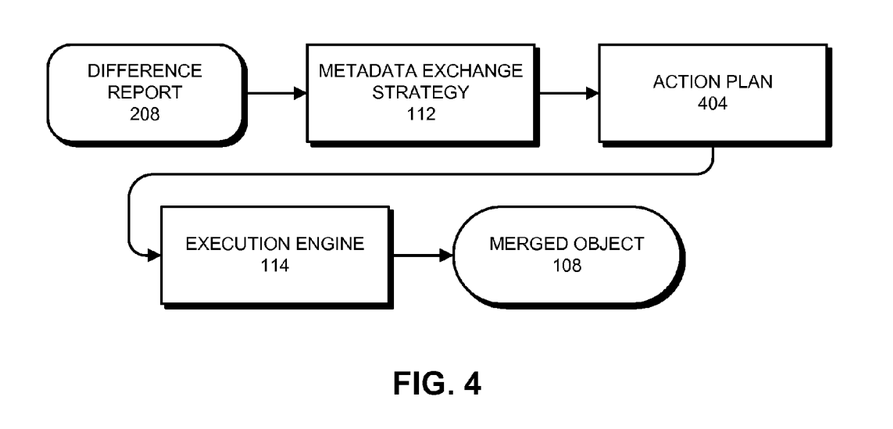
FIG. 4 illustrates the process of creating an action plan and a merged object in accordance with an embodiment of the present invention.

FIG. 4 illustrates the process of creating an action plan and a merged object in accordance with an embodiment of the present invention. Metadata exchange strategy 112 receives a difference report 208 created by metadata change manager 110. During this process, metadata exchange strategy 112 is used to examine difference report 208 and to create an action plan 404 for merging the two objects used in creating difference report 208.

Next, execution engine 114 receives action plan 404. After a user selects which items of action 404 are to be performed, execution engine 114 creates merged object 108.

Creation of an action plan requires the user to specify if a merge or a replace plan is preferred. The replace plan means deleting everything form the target the does not have a match in the source, while the merge plan would not allow deletion of anything from the target.

After the action plan has been created, the user can customize the action plan to apply the specific actions that are desired. Applying the action plan causes creation, deletion, or updates of the target object. Also, the user has the ability to specify which attributes in the target that need to be 3 updated in the event of create or update in the target. The user can also change the values to suit the required needs. This is determined at the time when the user wants to execute the created action plan.

Source and Target Objects

Figure 5:
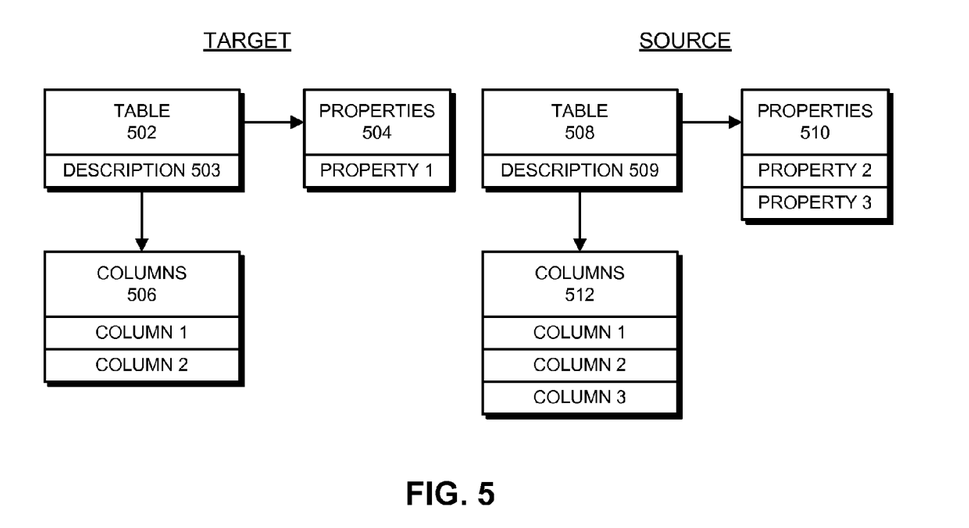
FIG. 5 illustrates source and target objects in accordance with an embodiment of the present invention.

FIG. 5 illustrates source and target objects in accordance with an embodiment of the present invention. These source and target objects include metadata for table 508 and table 502, respectively, and originated from the same metadata. Source table 508 includes a description 509 of table 508. Additionally, source table 508 is associated with columns 512 and properties 510. Properties 510 include property 2 and property 3, and columns 512 include column 1, column 2, and column 3. Together, table 508, properties 510, and columns 512 describe a corresponding database table.

Target table 502 includes a description 503 of table 502. Additionally, target table 502 is associated with columns 506 and properties 504. Properties 504 includes property 1, and columns 506 include column 1 and column 2. Together, table 502, properties 504, and columns 506 describe a corresponding database table. Note that any mapping between columns 506 of table 502 and columns 512 of table 508 is possible. For example, column 1 of columns 506 and column 2 of columns 512 may refer to the same data, while column 2 of columns 506 and column 1 of columns 512 may also refer to the same data.

Difference Report

Figure 6:
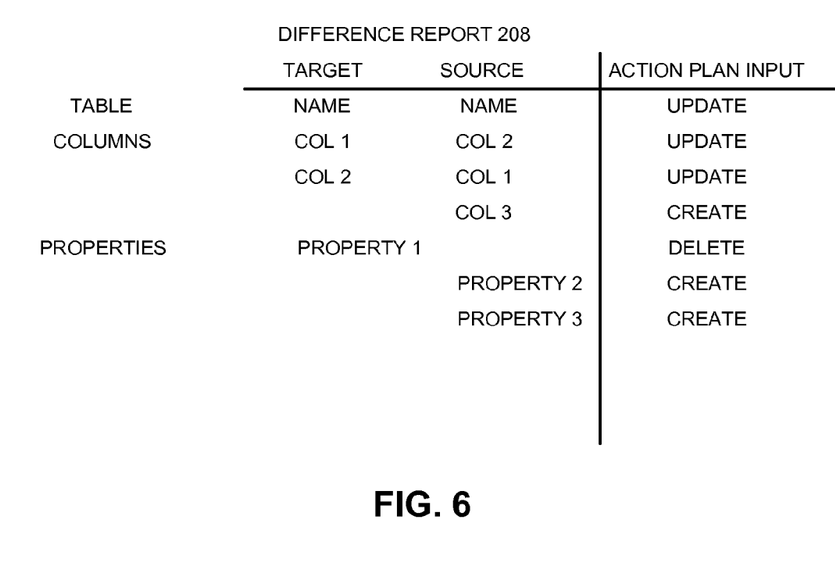
FIG. 6 illustrates a difference report in accordance with an embodiment of the present invention.

FIG. 6 illustrates a difference report 208 in accordance with an embodiment of the present invention. Note that there are many ways to compare different components of the metadata. In this example, tables are being compared by name, columns are being compared by position, and properties are being compared by name.

Difference report 208 includes data for the parameters being compared, in this example table name, column position, and properties. The comparison of the table names indicates that the target and source have the same name; therefore the input into the action plan is to update the table.

The comparison of the columns indicates that column 1 in the target includes the same data as column 2 in the source and that column 2 in the target includes the same data as column 1 in the source. The input to the action plan is to update the column descriptions. Since column 3 exists in the source but not in the destination, the input to the action plan is to create column 3 in the target.

The comparison of the properties indicates that property 1 exists in the target but not in the source, while properties 2 and 3 exist in the source but not in the destination. The action plan for the properties includes deleting property 1 and creating properties 2 and 3. These actions will bring the target into alignment with the source if the user selects all of the actions as described below in conjunction with FIG. 7.

Action Plan

Figure 7:
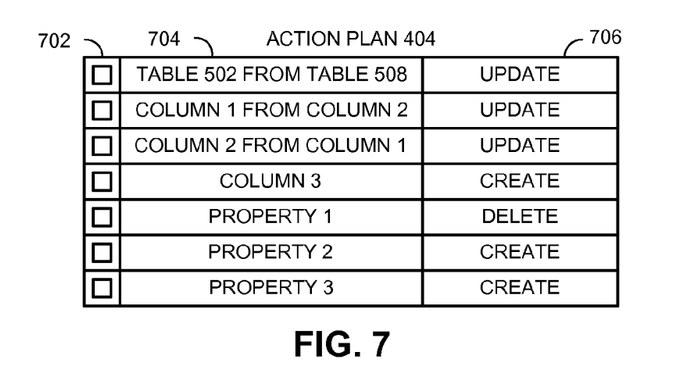
FIG. 7 illustrates an action plan in accordance with an embodiment of the present invention.

FIG. 7 illustrates an action plan 404 in accordance with an embodiment of the present invention. Action plan 404 includes actions derived from difference report 208 described above in conjunction with FIG. 6. Each line of action plan 404 includes a checkbox 702, a description of the action 704, and an action 706. A user can select which actions are required by checking the checkbox in column 702. After the user checks the actions, execution engine 114 performs the checked actions.

Merging Metadata

Figure 8:
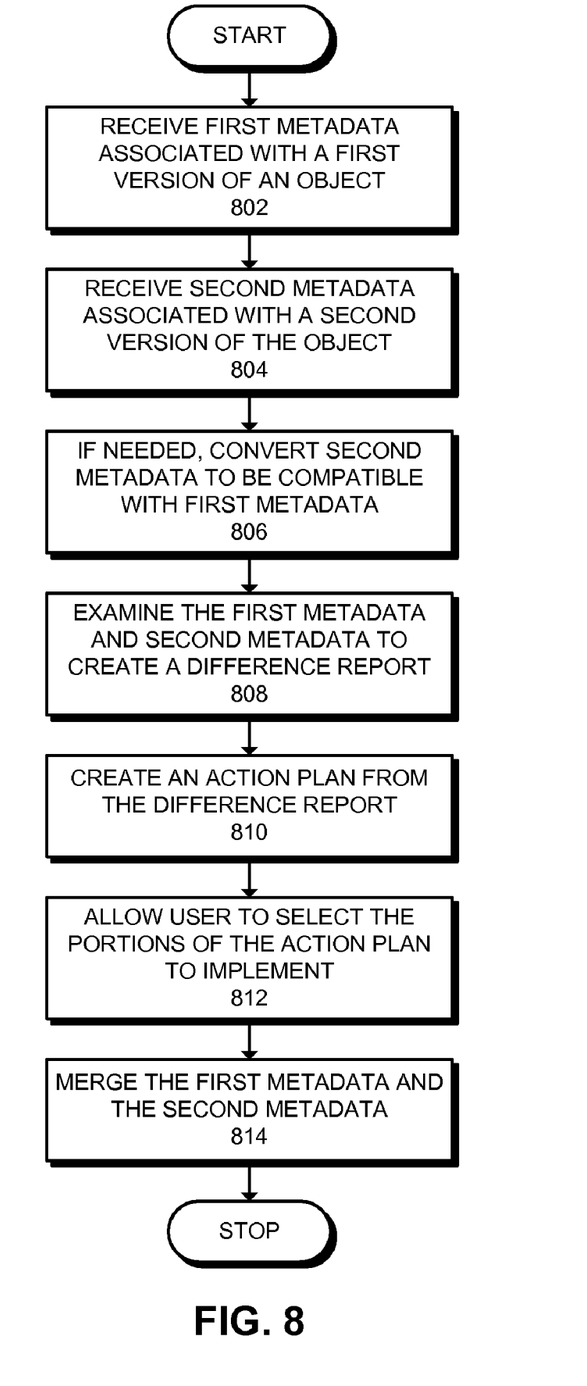
FIG. 8 presents a flowchart illustrating the process of merging metadata associated with a first object and a second object in accordance with an embodiment of the present invention.

FIG. 8 presents a flowchart illustrating the process of merging metadata associated with a first object and metadata associated with a second object in accordance with an embodiment of the present invention. The system starts when a first metadata associated with the first version of an object is received (step 802). Next, the system receives the second metadata associated whit the second version of the object (step 804). Note that steps 802 and 804 can occur in the opposite order or simultaneously. If needed, the system converts the second metadata to be compatible with the first metadata (step 806).

After receiving the first metadata and the second metadata, the system examines the first metadata and the second metadata to create a difference report (step 808). The system then creates an action plan from the difference report (step 810).

Next, the system allows a user to select portions of the action plan to implement by checking checkboxes in the action plan (step 812). Finally, the system uses the selected actions to merge the first metadata and the second metadata to create merged metadata (step 814).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer implemented method to facilitate merging different versions of a database object, comprising:
   receiving metadata associated with a first version of the database object and a second version of the database object;
   creating a difference report by comparing the metadata associated with the first version of the database object with metadata associated with the second version of the database object;
   creating an action plan from the difference report, wherein the action plan specifies how to merge metadata associated with the first version of the database object with metadata associated with the second version of the database object;
   receiving an indication of which actions to take in merging metadata in order to produce merged metadata with desired properties and attributes; and
   facilitating merging the metadata associated with the first version of the database object with the metadata associated with the second version of the object based on the action plan, wherein the first version and second version of the database object include other objects.

2. The method of claim 1, wherein metadata associated with the first version and the second version of the database object are represented in Unified Modeling Language.

3. The method of claim 1, wherein comparing metadata associated with the first version and second version of the database object involves customizing which associations to compare.

4. The method of claim 1, wherein comparing metadata associated with the first version and second version of the database object involves customizing how to compare the first metadata and the second metadata.

5. The method of claim 1, wherein creating the action plan involves examining the difference report to determine what actions to take in bringing metadata associated with the first version and second versions of the database object into agreement.

6. The method of claim 1, wherein metadata associated with first and second versions of the metadata object can define database objects, wherein database objects include tables, columns, dimensions, cube, views, materialized views, and external tables.

7. The method of claim 1, wherein the action plan can specify a number of actions including creating, updating, and deleting database objects, and their properties.

8. A computer-readable storage medium storing instructions that when executed by a computer cause the computer to perform a method to facilitate merging different versions of a database object, the method comprising:
   receiving metadata associated with a first version of the database object and a second version of the database object;

creating a difference report by comparing the metadata associated with the first version of the database object with metadata associated with the second version of the database object;

creating an action plan from the difference report, wherein the action plan specifies how to merge metadata associated with the first version of the database object with metadata associated with the second version of the database object;

receiving an indication of which actions to take in merging metadata in order to produce merged metadata with desired properties and attributes; and facilitating merging the metadata associated with the first version of the database object with the metadata associated with the second version of the object based on the action plan, wherein the first version and second version of the database object include other objects.

9. The computer-readable storage medium of claim 8, wherein metadata associated with the first version and the second version of the database object are represented in Unified Modeling Language.

10. The computer-readable storage medium of claim 8, wherein comparing metadata associated with the first version and second version of the database object involves customizing which associations to compare.

11. The computer-readable storage medium of claim 8, wherein comparing metadata associated with the first version and second version of the database object involves customizing how to compare the first metadata and the second metadata.

12. The computer-readable storage medium of claim 8, wherein creating the action plan involves examining the difference report to determine what actions to take in bringing metadata associated with the first version and second versions of the database object into agreement.

13. The computer-readable storage medium of claim 8, wherein metadata associated with first and second versions of the metadata object can define database objects, wherein database objects include tables, columns, views, dimensions, and cubes.

14. The computer-readable storage medium of claim 8, wherein the action plan can specify a number of actions including creating, updating, and deleting database objects and their properties.

15. An apparatus to facilitate merging different versions of a database object, comprising:

a processor;

a memory;

a receiving mechanism configured to receive metadata associated with a first version of the database object and a second version of the database object;

a difference-report-creating mechanism configured to create a difference report by comparing the metadata associated with the first version of the database object with metadata associated with the second version of the database object;

an action-plan creating mechanism configured to create an action plan from the difference report that specifies how to merge metadata associated with the first version of the database object with metadata associated with the second version of the database object;

a receiving mechanism configured to receive an indication of which actions to take in merging metadata in order to produce merged metadata with desired properties and attributes; and a merging mechanism configured to facilitate merging the metadata associated with the first version of the database object with the metadata associated with the second version of the object based on the action plan.

16. The apparatus of claim 15, wherein metadata associated with the first version and the second version of the database object are represented in Unified Modeling Language.

17. The apparatus of claim 15, wherein comparing metadata associated with the first version and second version of the database object involves customizing which associations to compare.

18. The apparatus of claim 15, wherein comparing metadata associated with the first version and second version of the database object involves customizing how to compare the first metadata and the second metadata.

19. The apparatus of claim 15, wherein creating the action plan involves examining the difference report to determine what actions to take in bringing metadata associated with the first version and second versions of the database object into agreement.

20. The apparatus of claim 15, wherein metadata associated with first and second versions of the metadata object can define tables, columns, properties of tables, and properties of columns.

21. The apparatus of claim 15, wherein the action plan can specify a number of actions including creating, updating, and deleting tables, columns, or properties.

* * * * *

UNITED STATES PATENT AND TRADEMARK OFFICE
CERTIFICATE OF CORRECTION

| | | |
|---|---|---|
| PATENT NO. | : 8,103,641 B2 | |
| APPLICATION NO. | : 12/323062 | |
| DATED | : January 24, 2012 | |
| INVENTOR(S) | : Baskaran et al. | |

It is certified that error appears in the above-identified patent and that said Letters Patent is hereby corrected as shown below:

In column 3, line 41, delete "108," and insert -- 111, --, therefor.

In column 3, line 47, after "8" insert -- . --.

In column 3, line 52, delete "108" and insert -- 106 --, therefor.

In column 3, line 56, delete "102" and insert -- 104 --, therefor.

In column 3, line 58, delete "102" and insert -- 104 --, therefor.

In column 3, line 66, delete "example" and insert -- example, --, therefor.

In column 4, line 2, delete "form" and insert -- from --, therefor.

In column 4, line 45, delete "form" and insert -- from --, therefor.

In column 4, line 45, before "does" delete "the" and insert -- that --, therefor.

In column 4, line 52, before "updated" delete "3".

In column 5, line 56, delete "whit" and insert -- with --, therefor.

Signed and Sealed this
Third Day of April, 2012

David J. Kappos
*Director of the United States Patent and Trademark Office*